United States Patent
Ito et al.

(10) Patent No.: US 7,018,048 B2
(45) Date of Patent: Mar. 28, 2006

(54) PROJECTOR EXHAUST FAN

(75) Inventors: Shinsuke Ito, Shiojiui (JP); Toshio Matsumiya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 190 days.

(21) Appl. No.: 10/614,125

(22) Filed: Jul. 8, 2003

(65) Prior Publication Data

(30) Foreign Application Priority Data

Jul. 10, 2002 (JP) ............................. 2002-200922

(51) Int. Cl.
- G03B 21/16 (2006.01)
- G03B 21/18 (2006.01)
- G03B 21/26 (2006.01)
- G03B 21/14 (2006.01)

(52) U.S. Cl. ........................ 353/57; 353/119; 353/60; 353/61

(58) Field of Classification Search ............ 353/57–61, 353/119, 38, 55, 52, 31, 33, 34, 37
See application file for complete search history.

(56) References Cited

U.S. PATENT DOCUMENTS

| | | | | |
|---|---|---|---|---|
| 6,065,838 A | * | 5/2000 | Konuma et al. | 353/61 |
| 6,280,038 B1 | * | 8/2001 | Fuse et al. | 353/57 |
| 6,422,703 B1 | * | 7/2002 | Wang et al. | 353/61 |
| 6,481,854 B1 | * | 11/2002 | Sugawara et al. | 353/52 |
| 6,618,213 B1 | * | 9/2003 | Inamoto | 359/889 |
| 6,641,267 B1 | * | 11/2003 | Ohishi et al. | 353/61 |
| 6,840,628 B1 | * | 1/2005 | Arai et al. | 353/58 |
| 2001/0008439 A1 | * | 7/2001 | Konuma et al. | 353/52 |
| 2001/0043312 A1 | | 11/2001 | Fuse et al. | 353/57 |

FOREIGN PATENT DOCUMENTS

| | | |
|---|---|---|
| EP | 0 829 750 A2 | 3/1998 |
| EP | 0 840 522 A2 | 5/1998 |
| JP | A-8-304739 | 11/1996 |
| JP | A-10-90811 | 4/1998 |
| JP | A-10-186546 | 7/1998 |
| JP | A-11-160793 | 6/1999 |
| JP | 11-354963 | 12/1999 |
| JP | A-2000-19496 | 1/2000 |
| JP | A-2002-55389 | 2/2002 |
| JP | A-2002-150832 | 5/2002 |
| JP | A-2002-189249 | 7/2002 |

* cited by examiner

Primary Examiner—Judy Nguyen
Assistant Examiner—Andrew Sever
(74) Attorney, Agent, or Firm—Oliff & Berridge, PLC (57) ABSTRACT

An exhaust sirocco fan exhausts the air inside the projector outside. An inlet of the exhaust sirocco fan is disposed along the plane orthogonal to the optical path plane formed by the optical unit, i.e. along the thickness direction of the projector. In other words, the optical unit or the exhaust sirocco fan need not be disposed in the thickness direction of the projector in an overlapping manner. Therefore, by efficiently sucking the inside air, the exhaust efficiency can be enhanced and calmness can be ensured in the projector.

8 Claims, 9 Drawing Sheets

PROJECTOR EXHAUST FAN

BACKGROUND OF THE INVENTION

1. Field of Invention

The present invention relates to a projector.

2. Description of Related Art

Hitherto, it has been known that a projector is used during the presentation at conferences, academic meetings, exhibitions, or the like. In such a projector, the light flux emitted from a light source device is modulated by an optical modulator according to image information, to form an optical image, and the optical image is projected in an enlarged manner by a projection optical system.

In such a projector, high brightness of a light source is required in order to sharply display the projected optical image, and the heat generated by the light source must be radiated outside.

Thus, an exhaust structure to exhaust the air heated inside the projector outside by a fan is employed (see Japanese Unexamined Patent Application Publication No. 11-354963, for example).

In the exhaust structure, a centrifugal fan is employed as a fan to exhaust the air inside the projector outside.

An inlet of the exhaust sirocco fan is disposed along an optical path plane formed of a light source lamp as a light source device, a liquid crystal panel as an optical modulator, and a projection lens as a projection optical system.

The exhaust sirocco fan sucks the air heated by the liquid crystal panel, the light source lamp, or the like located above the inlet, and exhausts the air in the projecting direction of the light flux from the projection lens, i.e., from the front side of the projector to the outside.

However, in the above exhaust structure, the exhaust sirocco fan is located below the liquid crystal panel and the light source lamp or the like so that the inlet of the exhaust fan is disposed along the optical path plane. Thus, the number of revolutions of the exhaust fan must be increased to suck the air heated by the light source lamp and the liquid crystal panel or the like, i.e., the ascending air of smaller density downwardly.

Therefore, problems occur in that it is difficult to efficiently suck the air inside the projector by the exhaust sirocco fan, the noise level of the exhaust fan itself becomes high, and calmness of the projector cannot be ensured.

Accordingly, in light of the above problems, an object of the present invention is to provide a projector which can improve the exhaust efficiency by efficiently sucking the air inside the projector, and ensure calmness.

SUMMARY OF THE INVENTION

The projector of the present invention includes: a light source device; an optical modulator to modulate the light flux emitted from the light source device according to image information; and a projection optical system to project the light flux modulated by the optical modulator in an enlarged manner, and further has an exhaust fan to exhaust the air inside the projector outside, this exhaust fan is a centrifugal fan to exhaust the air sucked from the direction of a rotary shaft of the fan in the tangential direction of the rotation, and the inlet of the centrifugal fan is disposed along the plane orthogonal to the optical path plane formed by the light source device, the optical modulator, and the projection optical system.

In the present invention, the projector has the centrifugal fan, and the inlet of the centrifugal fan is disposed along the plane orthogonal to the optical path plane formed by the light source device, the optical modulator and the projection optical system. Therefore, the exhaust efficiency can be enhanced by efficiently sucking the air inside the projector.

In addition, the air inside the projector can be sucked without increasing the number of revolutions of the fan more than required, and calmness of the projector can be ensured.

In addition, the centrifugal fan and the light source device or the optical modulator need not be disposed in the thickness direction of the projector in an overlapping manner, and a space inside the projector can be effectively used.

In the projector of the present invention, the inlet of the centrifugal fan is preferably disposed in an inclined manner to the optical axis of illumination of the light flux of the light source device.

In this configuration, the inlet of the centrifugal fan is arranged in an inclined manner to the optical axis of illumination of the light flux emitted from the light source device, and for example, when the centrifugal fan is disposed in the vicinity of the light source device, direct reception of the heat radiated from the light source device is avoided, and troubles caused by the heat of the centrifugal fan can be reduced or prevented.

In the projector of the present invention, the inlet of the centrifugal fan is preferably disposed closer toward the emitting direction of the light flux from the light source device.

In this configuration, the inlet of the centrifugal fan is disposed closer toward the emitting direction of the light flux from the light source device, and troubles caused by the heat of the centrifugal fan can be reduced or prevented. The air heated by the heat radiated from the light source device can be efficiently sucked and exhausted outside.

In the projector of the present invention, the lamp drive block to drive the light source device and/or the power source block to feed the power to the lamp drive block, are provided, and the centrifugal fan is preferably disposed between the light source device and the lamp drive block and/or the power source block.

In this configuration, the projector has the lamp drive block and/or the power source block, and the centrifugal fan is disposed between the light source device and the lamp drive block and/or the power source block. Therefore, both the air heated by the heat radiated from the light source device and the air heated by the heat radiated from the lamp drive block and/or the power source block are sucked by the centrifugal fan, and exhausted outside. Thus, the air inside the projector can be efficiently exhausted with a simple structure.

In the projector of the present invention, the centrifugal fan is disposed on any end of the lamp drive block and/or the power source block, and the air intake fan to suck the cooled air from the outside is preferably disposed on an end facing the end.

In this configuration, the projector has the air intake fan, and the air intake fan and the centrifugal fan are disposed on ends facing each other of the lamp drive block and/or the power source block. Therefore, the air intake fan disposed on one end sucks the cooled air from the outside, and feeds the cooled air to the lamp drive block and/or the power source block. The fed cooled air passes through the heated lamp drive block and/or power source block, and is sucked by the centrifugal fan disposed on the other end, and exhausted outside. Accordingly, the heated lamp drive block and/or power source block are efficiently cooled. The air heated by the heat radiated from the lamp drive block and/or the power source block can be efficiently exhausted by a simple structure.

In the projector of the present invention, the inlet, from which the outside air is sucked inside, is formed in the exterior case to accommodate the light source device, the optical modulator, and the projection optical system. The air intake fan is preferably disposed in an inclined manner to the inlet.

In this configuration, the inlet is formed in the exterior case of the projector, and the air intake fan is disposed in an inclined manner to this inlet. Therefore, the level of the noise leaking outside from the air intake fan itself via the inlet is reduced, and calmness during the operation of the projector can be ensured.

In the projector of the present invention, an outlet which is located in the projecting direction of the light flux from the projection optical system and exhausts the inside air outside, is formed in the exterior case to accommodate the light source device, the optical modulator, and the projection optical system. The centrifugal fan preferably exhausts the inside air in the direction separating from the projecting direction of the light flux from the projection optical system via the outlet.

In this configuration, the outlet is formed in the exterior case of the projector on the projection side of the projector, and thus, the heated air exhausted from the projector is exhausted from the projection side. In other words, the heated air is reduced or prevented from being blown against a person located on a back side or a side surface side of the projector.

In addition, the centrifugal fan can set the exhaust direction to be in a direction deviated from the projection image projected by the projector, and prevent the projection image from being shaken by the heated air by exhausting the inside air in the direction separating from the projecting direction of the light flux projected from the projection optical system.

In the projector of the present invention, the light source device, the optical modulator, and the projection optical system are preferably accommodated in a casing for optical components which is substantially U-shaped in plan view.

In this configuration, the light source device, the optical modulator, and the projection optical system are accommodated in the casing for optical components which is substantially U-shaped in plan view. For example, the light source device and the projection optical system are disposed on each end of the substantial U-shape in plan view, and the centrifugal fan is disposed in the vicinity of the light source device. The air can thus be exhausted from the projection side of the projector, any duct to lead the heated air from the centrifugal fan can be omitted, and the size of the projector can be reduced.

DETAILED DESCRIPTION OF PREFERRED EMBODIMENTS

An exemplary embodiment of the present invention will be described below with reference to the drawings.

1. Main Configuration of a Projector

Figure 1:
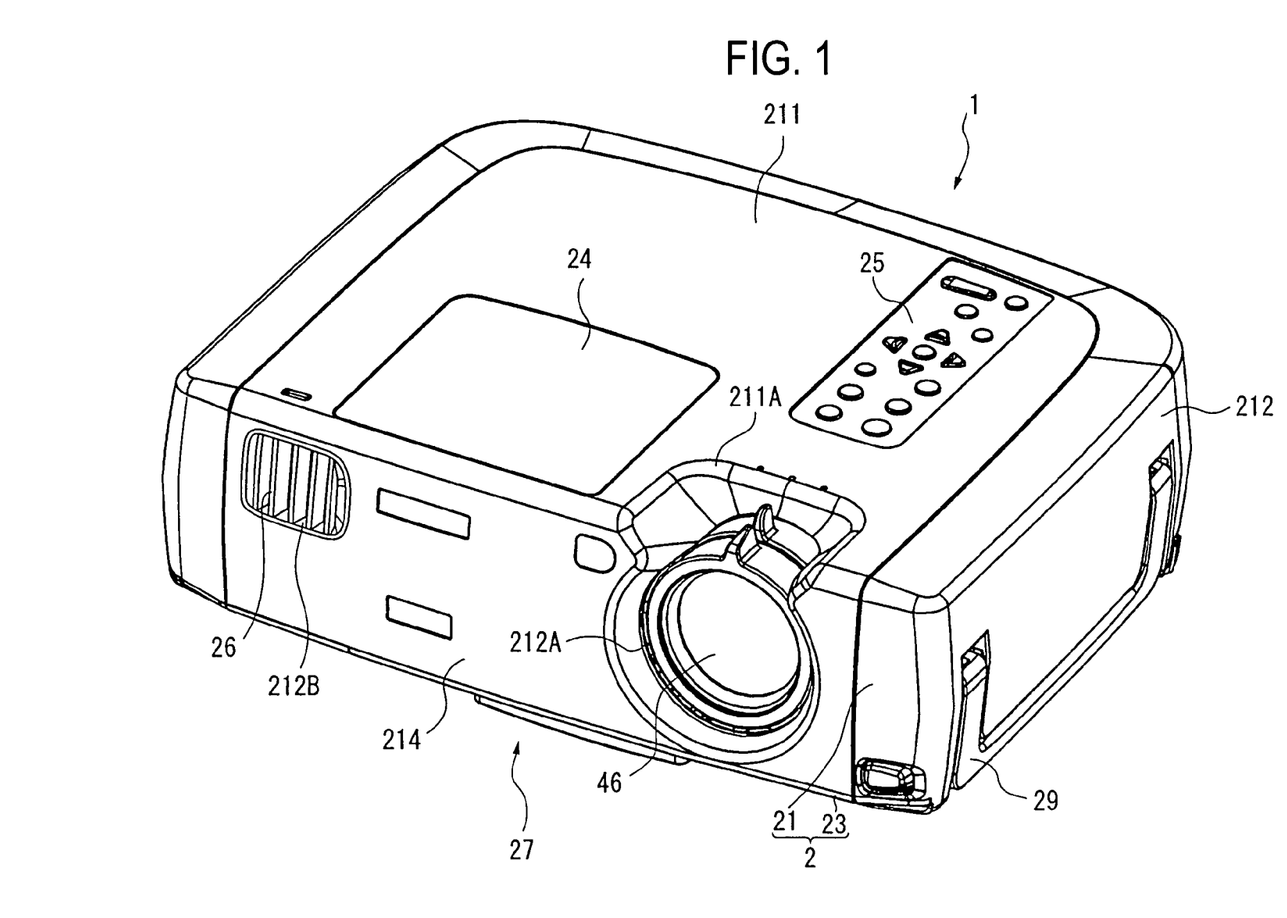
FIG. 1 is an overall perspective view of a projector according to an exemplary embodiment when viewed from above.
Figure 2:
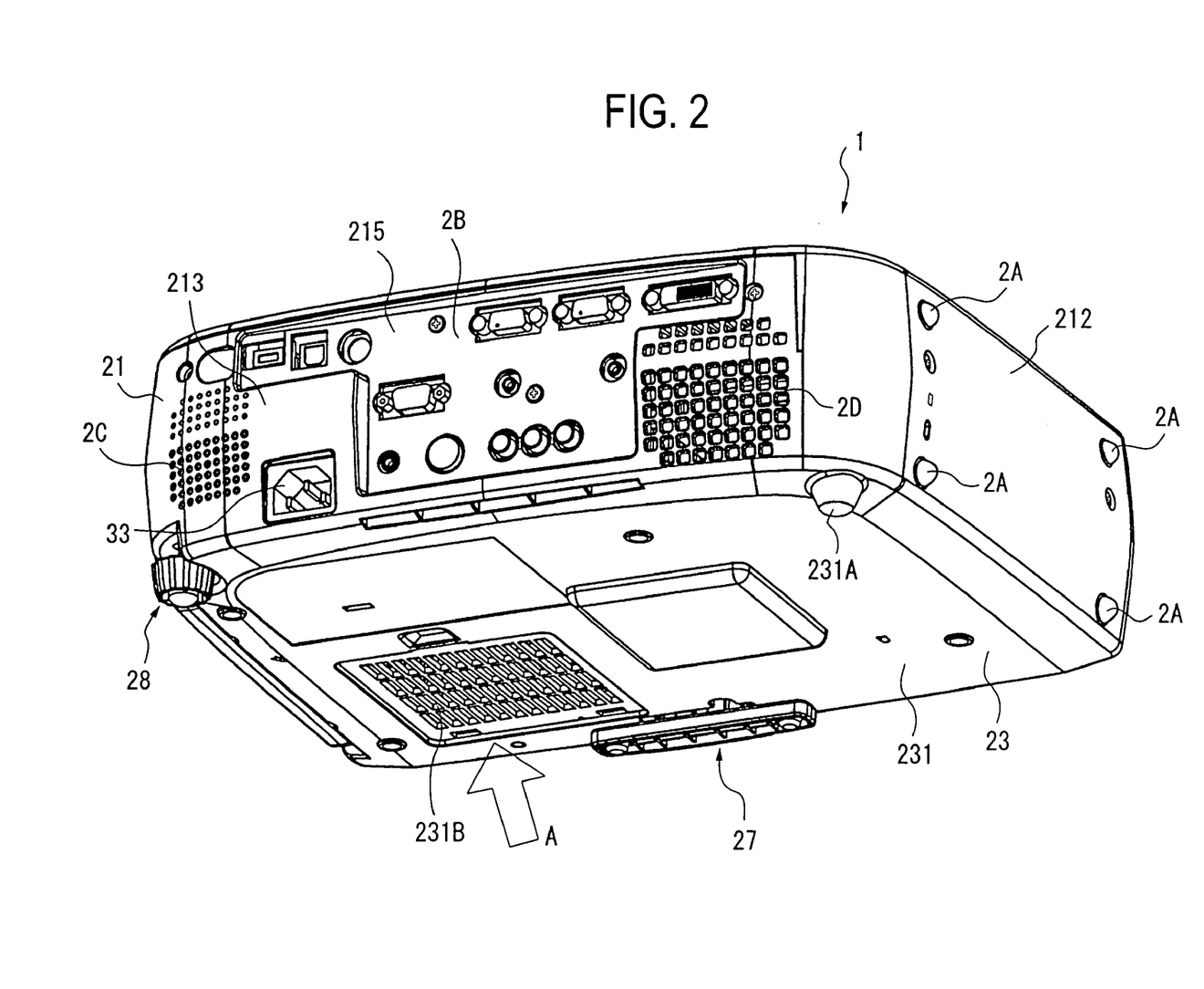
FIG. 2 is an overall perspective view of a projector according to an exemplary embodiment when viewed from below.
Figure 3:
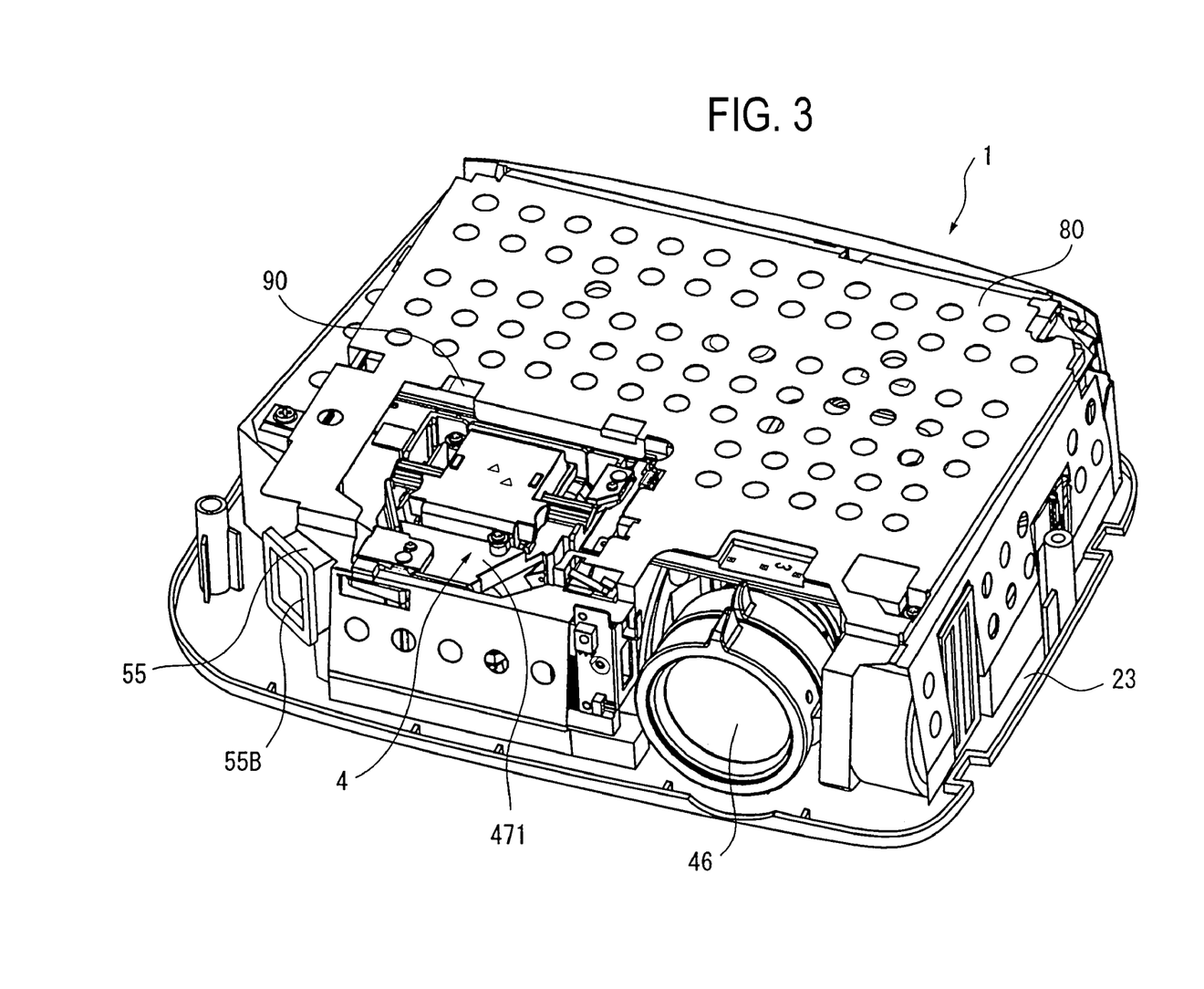
FIG. 3 is a perspective view of an inner side of a projector according to an exemplary embodiment.
Figure 4:
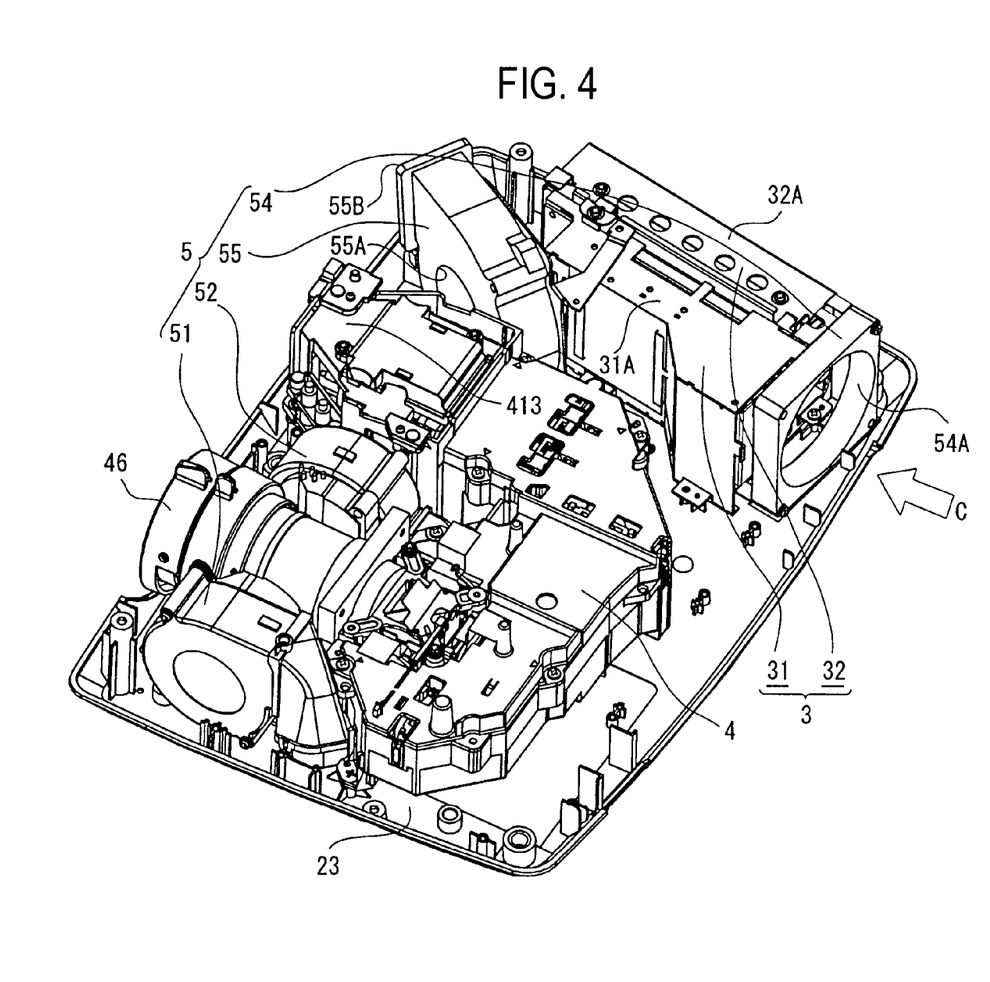
FIG. 4 is a perspective view of an inner side of a projector according to an exemplary embodiment.
Figure 5:
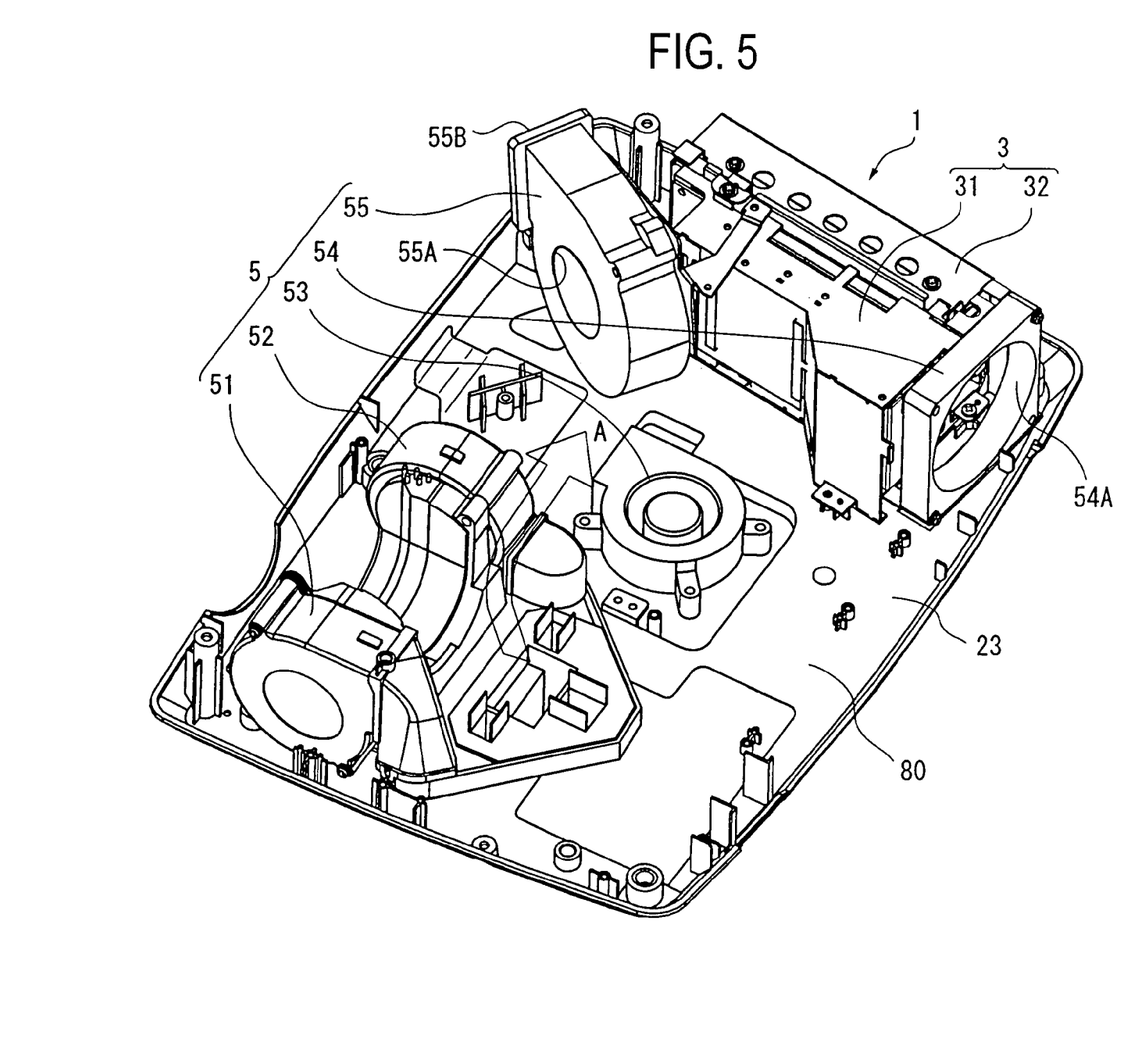
FIG. 5 is a perspective view of an inner side of a projector according to an exemplary embodiment.

FIG. 1 is an overall perspective view of a projector 1 according to an exemplary embodiment when viewed from above, FIG. 2 is an overall perspective view of the projector 1 when viewed from below, FIGS. 3 to 5 are perspective views of the inner side of the projector 1. More specifically, FIG. 3 shows the projector 1 in FIG. 1 with an upper case 21 detached therefrom. FIG. 4 shows the projector in FIG. 3 with a shield plate 80 and a driver board 90 detached therefrom. FIG. 5 shows the projector in FIG. 4 with an optical unit 4 detached therefrom. These components 4, 21, 55, 80 and 90 constituting the projector will be described below in detail.

In FIGS. 1 to 5, the projector 1 includes an exterior case 2, a power source unit 3 accommodated in the exterior case 2, an optical unit 4 of U-shape in plan view similarly disposed in the exterior case 2, and an interior cooling unit 5 similarly disposed in the exterior case 2. The entire projector is substantially parallelepiped.

The exterior case 2 includes an upper case 21 and a lower case 23 which are formed of a resin. These cases 21 and 23 are fixed to each other by screws.

The exterior case 2 is not necessarily formed of a resin, but may be formed of a metal. In addition, a part of the exterior case can be formed of a resin, and the other part thereof may be formed of a metal. For example, the upper case 21 may be formed of a resin, and the lower case 23 may be formed of a metal.

The upper case 21 includes an upper side part 211, a side surface part 212 provided therearound, a back side part 213, and a front side part 214.

A lamp cover 24 is attachably/detachably fitted to a front side of the upper side part 211. Further, in the upper side part 211, a notched part 211A, in which an upper face part of a projection lens 46 as a projection optical system is exposed, is provided on the side of the lamp cover 24. Zooming and focusing operations of the projection lens 46 can be manually performed via a lever. An operation panel 25 is provided on a back side of the notched part 211A.

A horizontally U-shaped handle 29 is turnably provided on one side (the right side in FIG. 1) of the side surface part 212. In addition, a side-fit 2A (FIG. 2) forming a leg when the projector 1 is erected with the handle 29 upside is provided on the other side (the right side in FIG. 2).

An interface part 2B is recessed on the inner side of the projector 1 in the back side part 213. An interface cover 215 is provided in the interface part 2B, and an interface board (not shown) with various kinds of connectors mounted thereon is disposed on the inner side of the interface cover 215.

A speaker hole 2C and an inlet 2D are provided on right and left sides of the interface part 2B. The inlet 2D is located behind the power source unit 3 within the projector.

The front side part 214 has a circular opening 212A continuous to the notched part 211A of the upper case 21, and the projection lens 46 is disposed corresponding to the circular opening 212A.

In this front side part 214, an outlet 212B to exhaust the inside air outside via the interior cooling unit 5 is located on the side opposite to the circular opening 212A.

This outlet 212B is located on the front side of the power source unit 3 inside the projector.

An exhaust louver 26 which exhausts the cooled air in the direction deviating from an image projection area, i.e., to the left side in FIG. 1, and has a light shielding function is provided on the outlet 212B.

The lower case 23 is formed in a substantially plate-like shape as shown in FIG. 4, and the power source unit 3, the optical unit 4, and the interior cooling unit 5 are placed thereon and fixed thereto.

In FIG. 2, a position adjusting mechanism 27 which adjusts the inclination of the entire projector 1 and aligns the projected image is provided on the front side of the bottom side part 231 of this lower case 23.

Further, another position adjusting mechanism 28 to adjust the inclination in another direction of the projector 1 is provided on one corner part on the back side of the bottom side part 231, and a rear-fit 231 A is provided on another corner part. However, the rear-fit 231A cannot adjust the position.

In addition, an inlet 231B for the cooled air is provided in the bottom side part 231.

As shown in FIG. 4, the power source unit 3 includes a power source 31 as a power source block, and a lamp drive circuit (ballast) 32 as a lamp drive block disposed on the side of the power source 31.

The power source 31 feeds the power fed through a power source cable to the lamp drive circuit 32, the driver board 90 (FIG. 3), and the like, and has an inlet connector 33 (FIG. 2) in which the power source cable is inserted.

The lamp drive circuit 32 feeds the power to the light source lamp 411 of the optical unit 4.

The driver board 90 controls the drive of a liquid crystal panel 441 which will be described below, according to image information.

The power source 31 and the lamp drive circuit 32 are disposed substantially parallel to each other, and a space occupied thereby is extended in the longitudinal direction aside the projector 1.

Further, each periphery of the power source 31 and the lamp drive circuit 32 is covered by cylindrical members 31A and 32A with right and left sides opened, and each surface thereof plated, metal vapor-deposited, or affixed with a metal foil. These cylindrical members 31A and 32A also have a function as a duct to guide the cooled air, in addition to a function of preventing any leakage of electromagnetic noise between the power source 31 and the lamp drive circuit 32.

Figure 6:
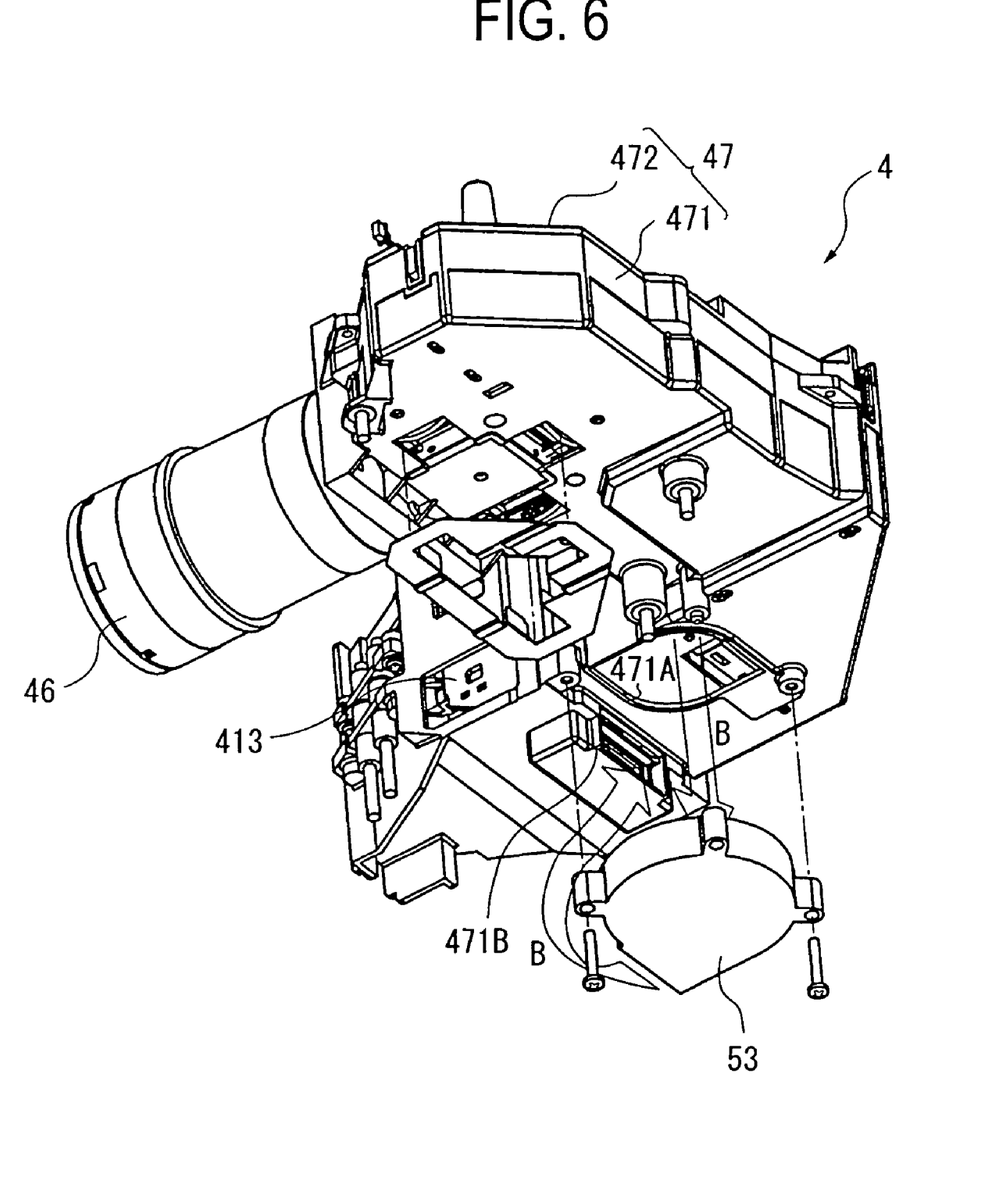
FIG. 6 is a perspective view of an optical unit according to an exemplary embodiment when viewed from below.
Figure 7:
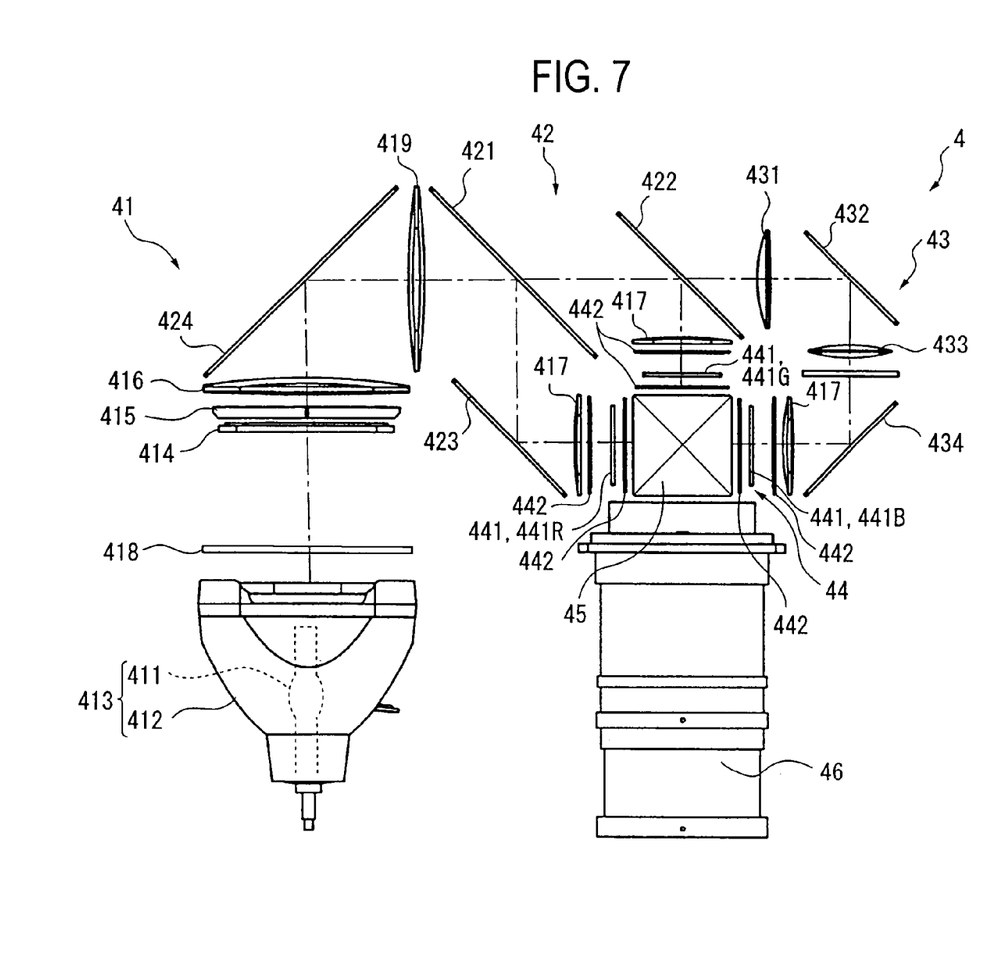
FIG. 7 is a schematic plan view of an optical system of a projector according to an exemplary embodiment.

The optical unit 4 forms an optical image corresponding to image information by optically processing the light flux emitted from the light source lamp 411 as shown in FIGS. 4, 6 and 7. This optical unit 4 includes an integrator illumination optical system 41, a color separation optical system 42, a relay optical system 43, an electro-optic unit 44, a cross dichroic prism 45 (FIG. 7), and a projection lens 46.

The interior cooling unit 5, as shown in FIG. 5, sucks the outside cooled air, and introduces it inside the projector 1 to cool internal heat generating members, and exhausts the heated air outside. This interior cooling unit 5 includes a pair of panel cooling fans 51 and 52 to mainly cool the electro-optic unit 44 of the optical unit 4, a lamp cooling fan 53 to mainly cool the light source lamp 411, an axial flow fan 54 as an air intake fan which sucks the outside cooled air and feeds it to the power source unit 3, and an exhaust fan 55 as a centrifugal fan to exhaust the air inside the projector 1 outside.

Each periphery, including upper and lower parts of the power source unit 3, the optical unit 4, and the interior cooling unit 5, is covered by the aluminum shield plate 80 (FIGS. 3 and 5), preventing any leakage of electromagnetic noise from the power source unit 3 or the like outside.

2. Detailed Configuration of the Optical System

In FIG. 7, the integrator illumination optical system 41 is an optical system to illuminate an image forming area of three liquid crystal panels 441 (respectively denoted by the liquid crystal panels 441R, 441G and 441B for each of red, green and blue lights) to constitute the electro-optic unit 44 in a substantially uniform manner, and includes a light source device 413, a first lens array 418, a second lens array 414 including a UV filter, a polarization transformation element 415, a first condenser lens 416, a reflecting mirror 424, and a second condenser lens 419.

The light source device 413 described above includes a light source lamp 411 as a radiation light source to emit the radiant beam, and a reflector 412 to reflect the radiant beam emitted from the light source lamp 411. The light source lamp 411 often includes a halogen lamp, a metal halide lamp, and a high-voltage mercury lamp. A parabolic mirror is used for the reflector 412. An elliptic mirror may be used together with a paralleling lens (concave lens) in place of the parabolic mirror.

The first lens array 418 has a configuration in which small lenses having a substantially rectangular outline when viewed from the direction of the optical axis are arrayed in a matrix. Each small lens splits the light flux emitted from the light source lamp 411 into a plurality of portions of the light flux. The outline shape of each small lens is set to be substantially similar to that of the image forming area of the liquid crystal panel 441. For example, if the aspect ratio (the ratio of the transverse dimension to the longitudinal dimension) of the image forming area of the liquid crystal panel 441 is set to be 4:3, the aspect ratio of each small lens is also set to be 4:3.

The second lens array 414 has a configuration substantially similar to that of the first lens array 418, in which small lenses are arrayed in a matrix. This second lens array 414 has a function of focusing an image of each small lens of the first lens array 418 on the liquid crystal panel 441 together with the first condenser lens 416 and the second condenser lens 419.

The polarization transformation element 415 is disposed between the second lens array 414 and the first condenser lens 416, and integrally unitized with the second lens array 414. This polarization transformation element 415 transforms the light from the second lens array 414 into one kind of polarized light, and the utilization efficiency of the light in the electro-optic unit 44 is improved thereby.

More specifically, each partial light, transformed into one kind of polarized light by the polarization transformation element 415, is substantially superposed on the liquid crystal panels 441R, 441G and 441B of the electro-optic unit 44 finally by the first condenser lens 416 and the second condenser lens 419. Since only one kind of polarized light can be used in the projector using the liquid crystal panel of the type of modulating the polarized light, about one half of the light from the light source lamp 411 to emit random polarized light cannot be used.

Thus, by using the polarization transformation element 415, the light emitted from the light source lamp 411 is transformed into substantially one kind of polarized light, and the utilization efficiency of the light in the electro-optic unit 44 is improved. This type of the polarization transformation element 415 is introduced in, for example, Japanese Unexamined Patent Application Publication No. 8-304739.

The color separation optical system 42 includes two dichroic mirrors 421 and 422, and a reflecting mirror 423, and has a function of separating the plurality of partial light fluxes emitted from the integrator illumination optical system 41 by the dichroic mirrors 421 and 422 into three colors of red, green and blue.

The relay optical system 43 includes an incidence side lens 431, a relay lens 433, and reflecting mirrors 432 and 434, and has a function of guiding the color light, i.e., the blue light, separated by the color separation optical system 42 to the liquid crystal panel 441B.

In this condition, the blue light composition and the green light composition of the light flux emitted from the integrator illumination optical system 41 are transmitted through the dichroic mirror 421 of the color separation optical system 42, and the red light composition is reflected thereby. The red light reflected by the dichroic mirror 421 is reflected by the reflecting mirror 423, passed through the field lens 417, and arranged in the polarizing direction by the polarizer 442, and then, reaches the liquid crystal panel 441R for the red color. This field lens 417 transforms each partial light flux emitted from the second lens array 414 into the light flux parallel to the axis (the main beam). The field lens 417 disposed on the light entering side of the other liquid crystal panels 441 G and 441B works in a similar manner.

The green light out of the blue light and the green light transmitted through the dichroic mirror 421 is reflected by the dichroic mirror 422, passed through the field lens 417, and arranged in the polarizing direction by the polarizer 442, and then, reaches the liquid crystal panel 441G for the green color. On the other hand, the blue light is transmitted through the dichroic mirror 422, passed through the relay optical system 43, and further through the field lens 417, arranged in the polarizing direction by the polarizer 442, and reaches the liquid crystal panel 441B for the blue light. The relay optical system 43 is used for the blue light because the optical path length of the blue light is longer than the optical path length of the light of other colors, and degradation of the utilization efficiency of the light caused by the light diffusion or the like is prevented. In other words, the partial light flux entering the incidence side lens 431 is transmitted to the field lens 417 as it is.

The electro-optic unit 44 has the three liquid crystal panels 441R, 441G and 441B for optical modulator. The liquid crystal panels 441R, 441G and 441B use, for example, a polysilicone TFT as a switching element, and each color light separated by the color separation optical system 42 is modulated according to image information to form an optical image by each of the liquid crystal panels 441R, 441G and 441B and the polarizers 442 located on the light flux entering side and the light flux emitting side.

The cross dichroic prism 45 synthesizes images modulated for each color light emitted from the three liquid crystal panels 441R, 441G and 441B to form a color image. In the cross dichroic prism 45, a dielectric multi-layered film to reflect the red light and a dielectric multi-layered film to reflect the blue light are formed along interfaces of four right-angle prisms in a substantially X-shape, and the three color lights are synthesized by these dielectric multi-layered films. The color image synthesized by the cross dichroic prism 45 is emitted from the projection lens 46, and projected on a screen in an enlarged manner.

Figure 8:
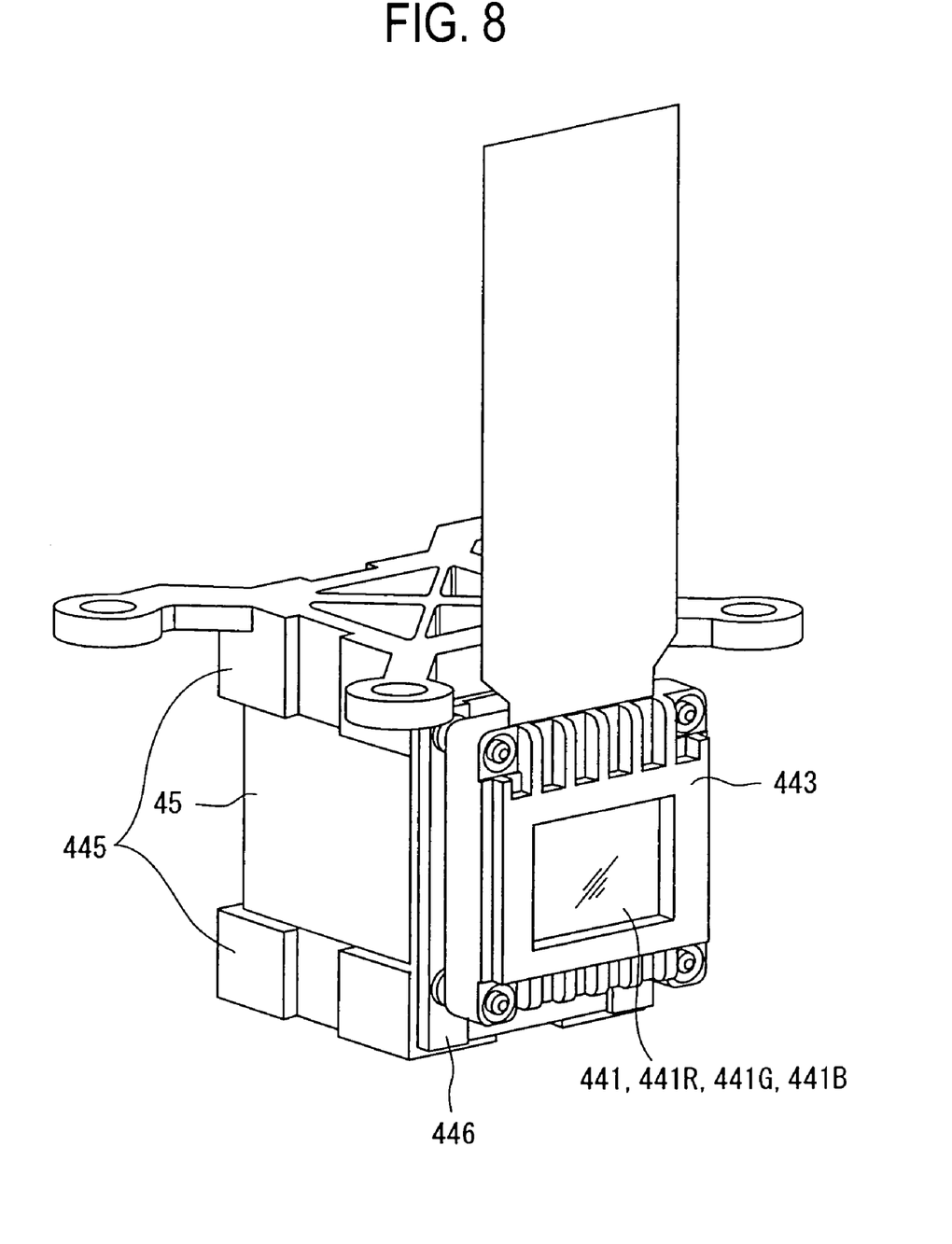
FIG. 8 is a perspective view of an optical device according to an exemplary embodiment from above.

These electro-optic unit 44 and the cross dichroic prism 45 are integrated with each other to constitute an optical device. FIG. 8 is a perspective view of the optical device when viewed from above.

The optical device includes the cross dichroic prism 45, the pedestal 445 fixed to upper and lower sides of the cross dichroic prism 45 (a pair of end faces across the light flux entering end face), each of the liquid crystal panels 441R, 441G and 441B, the holding frames 443 to accommodate each of the liquid crystal panels 441R, 441G and 441B, and the holding members 446 interposed between the holding frames 443 and a side surface of the pedestal 445, all of which are integrated with each other.

In order to simplify the figure, FIG. 8 shows only each one of the liquid crystal panels 441, the holding frames 443, and the holding members 446. These elements 441, 443 and 446 are actually disposed on other two light flux entering end faces of the cross dichroic prism 45.

The above-described optical systems 41-45 are accommodated in the synthetic resin casing 47 for optical components as the casing for optical components of substantially U-shaped in plan view as shown in FIGS. 4 and 6.

An upper casing 472 and a lower casing 471 are formed of a metal such as aluminum, magnesium and titanium, an alloy thereof, or a resin including polycarbonate containing carbon fillers, polyphenylene sulfide, and a liquid crystal resin, respectively.

This casing 47 for optical components includes the optical components 414–419, 421–424 and 431–434, the lower casing 471 having a groove part in which the polarizer 442 disposed on the light entering side of each of the liquid crystal panels 441R, 441G and 441B is slidably fitted from an upper part, and the lid-like upper casing 472 to close an opening side of the upper part of the lower casing 471.

In addition, the head part 49 is formed on the light emitting side of the casing 47 for optical components. The projection lens 46 is fixed to the front side of the head part 49, and the above-described optical device is fixed to the back side.

3. Configuration and Cooling Structure of the Interior Cooling Unit

The panel cooling sirocco fans 51 and 52 (FIG. 4) are disposed facing each other on both sides of the projection lens 46. These panel cooling fans 51 and 52 mainly cool the three liquid crystal panels 441 of the electro-optic unit 44, and function as a panel cooling system A.

In the panel cooling system A, firstly as shown in FIG. 2, the panel cooling fans 51 and 52 suck the cooled air from the inlet 231B on the lower side. This cooled air cools the liquid crystal panels 441R, 441G and 441B and the polarizers 442 (FIG. 7) on the light flux entering side and the light flux emitting side upwardly from their lower side. Then, the cooled air is moved to the exhaust sirocco fan 55 side of a front corner part while cooling a lower part of the driver board 90 (FIG. 3), and exhausted from the outlet 212B (FIG. 1) on the front side.

As shown in FIG. 5 or FIG. 6, the lamp cooling sirocco fan 53 is provided on a lower side of the optical unit 4, and the inlet of the lamp cooling sirocco fan 53 is disposed along the optical path plane formed by the optical unit 4 (the plane along the upper or lower surface of the casing 47 for optical components). This lamp cooling sirocco fan 53 mainly cools a light source lamp, and functions as a lamp cooling system B.

In the lamp cooling system B, the lamp cooling sirocco fan 53 attracts the cooled air in the projector 1. The attracted cooled air enters the casing 47 for optical components from an opening part (not shown) formed in the upper casing 472, and passes through a space between the second lens array 414 (FIG. 7) and the polarization transformation element 415 (FIG. 7) to cool these components.

Further, the lamp cooling sirocco fan 53 sucks the cooled air from the exhaust side opening 471A of the lower casing 471 as shown in FIG. 6. The lamp cooling fan 53 exhausts the cooled air again from the intake side opening 471B of the lower casing 471 into the casing 47 for optical components. The exhausted cooled air enters the light source device 413 to cool the light source lamp 411 (FIG. 7), and exits from the casing 47 for optical components and is exhausted from the outlet 212B (FIG. 1) by the exhaust fan 55.

Figure 9:
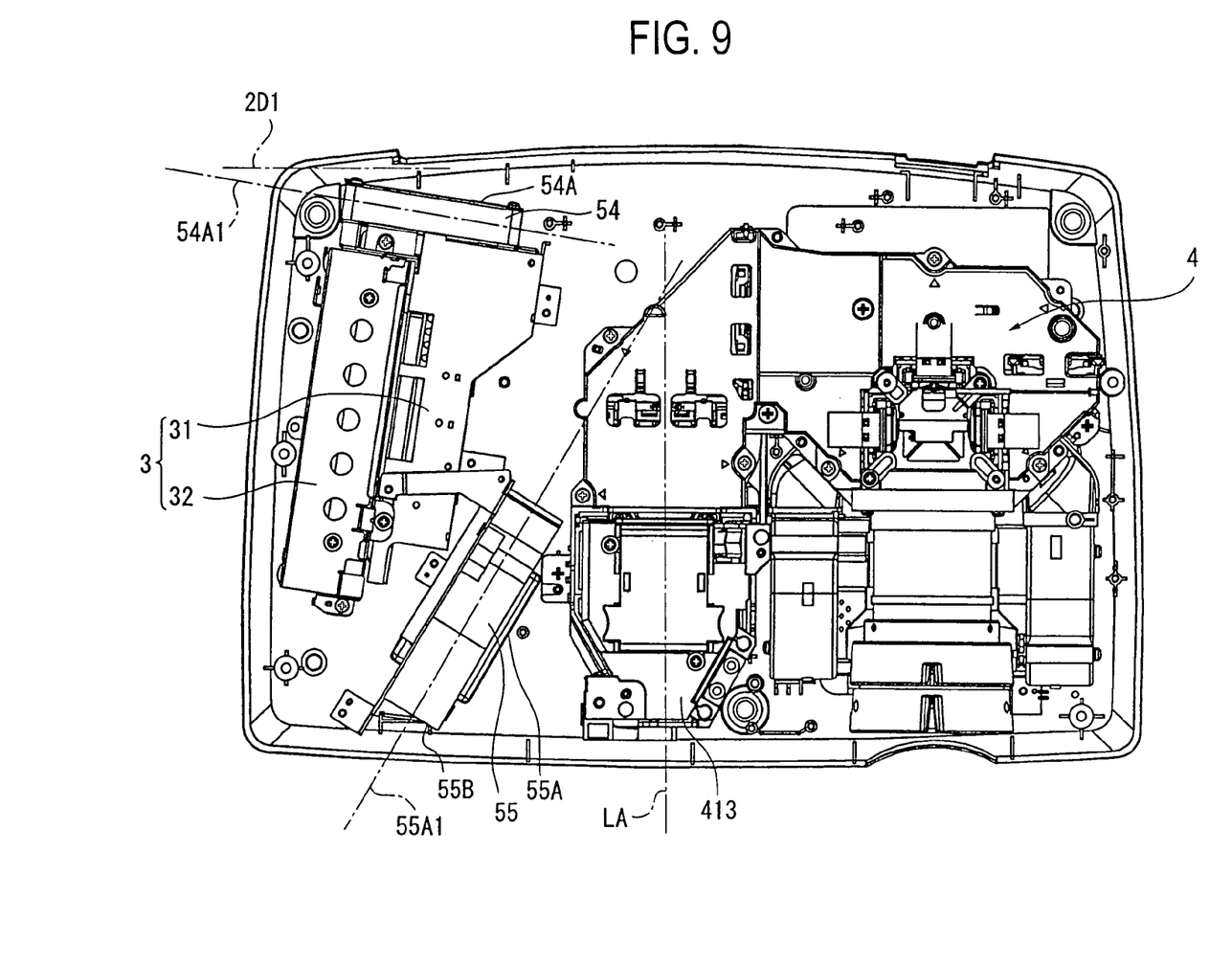
FIG. 9 shows a fan arrangement in an exemplary embodiment.

FIG. 9 is a schematic view of the arrangement of the fans.

As shown in FIG. 4, FIG. 5 or FIG. 9, the axial flow fan 54 is located behind the power source unit 3, and disposed facing the inlet 21D on the back side. As shown in FIG. 9, the axial flow fan 54 is disposed in an inclined manner so that the arrangement surface 54A1 of the inlet 54A is brought closer to the arrangement surface 2D1 of the inlet 2D (FIG. 2) toward the side surface of the projector 1. This axial flow fan 54 mainly cools the power source unit 3, and functions as a power source cooling system C.

In the power source cooling system C, the axial flow fan 54 sucks the outside cooled air from the inlet 2D on the back side. This cooled air is exhausted to the power source unit 3 side, and passes through the cylindrical members 31A and 32A to cool the power source 31 and the lamp drive circuit 32. Similar to the other cooling systems A and B, the cooled air is exhausted from the outlet 212B (FIG. 1) by the exhaust sirocco fan 55.

As shown in FIG. 4, the exhaust sirocco fan 55 is brought close to the light source device 413 of the optical unit 4, and the inlet 55A of the exhaust sirocco fan 55 is disposed along the plane orthogonal to the optical path plane formed by the optical unit 4, i.e., along the thickness direction of the projector 1.

Further, as shown in FIG. 9, this exhaust sirocco fan 55 is inclined so that the arrangement surface 55A1 of the inlet 55A is brought closer to the illumination optical axis LA of the light source device 413 toward the emitting direction of the light flux, and direct reception of the heat radiated from the light source device 413 is avoided.

In addition, this exhaust sirocco fan 55 is disposed between the light source device 413 and the power source unit 3, the exhaust sirocco fan 55 is located on one end of the power source unit 3, and the axial flow fan 54 is located on the other end.

Still further, the exhaust sirocco fan 55 is disposed so that the outlet 55B (FIG. 3) faces the outlet 212B (FIG. 1) on the front side. This outlet 55B is formed substantially rectangular, and an opening part thereof is smaller than the side surface of the exhaust sirocco fan 55. By thus reducing the size of the opening part, the noise leaking outside from the fan itself can be reduced, and calmness during the operation of the projector 1 can be ensured. In addition, the light emitting from the light source lamp 411 and leaking outside via the opening part can be reduced.

In this configuration, the exhaust sirocco fan 55 exhausts the air which is heated by the cooling systems A, B and C, and stored inside the projector 1 outside in the direction separating the projecting direction of the projector 1 via the outlet 212B (FIG. 1) on the front side.

4. Advantages of the Exemplary Embodiment

The present exemplary embodiment described above has the following advantages.

(1) The projector 1 has the exhaust sirocco fan 55 as the centrifugal fan, and the inlet 55A of the exhaust sirocco fan 55 is disposed along the plane orthogonal to the optical path plane formed by the optical unit 4. Thus, the air inside the projector 1 is efficiently sucked to improve the exhaust efficiency.

Further, the air inside the projector 1 can be sucked without increasing the number of rotation of the exhaust sirocco fan 55 more than required, and calmness of the projector 1 can be ensured.

Still further, the exhaust sirocco fan 55 and the optical unit 4 need not overlap each other in the thickness direction of the projector 1, the space inside the projector 1 can be effectively used.

(2) The exhaust sirocco fan 55 is disposed in an inclined manner so that the inlet 55A is brought closer to the light source device 413 toward the emitting direction of the light flux, direct reception of the heat from the light source device 413 is avoided, and any troubles of the exhaust sirocco fan 55 caused by the heat can be prevented. In addition, the air heated by the heat radiated from the light source device 413 can be efficiently sucked and exhausted outside.

(3) The projector 1 has the power source unit 3 including the power source 31 and the lamp drive circuit 32, and the exhaust sirocco fan 55 is disposed between the light source device 413 and the power source unit 3. Thus, the exhaust sirocco fan 55 can suck and exhaust outside both the air heated by the heat radiated from the light source device 413 and the air heated by the heat radiated from the power source unit 3.

Accordingly, the air inside the projector 1 can be efficiently exhausted by a simple structure.

(4) The projector 1 has the axial flow fan 54, and the axial flow fan 54 and the exhaust fan 55 are respectively disposed on end parts facing each other of the power source unit 3. Thus, the axial flow fan 54 disposed on the end part on the back side sucks the cooled air from the outside, and feeds the air to the power source unit 3. The fed cooled air passes through the heated power source unit 3, and is sucked by the exhaust sirocco fan 55 disposed on the end part of the front side (the projection side of the projector 1), and exhausted outside. Therefore, the heated power source unit 3 can be efficiently cooled, and the air heated by the heat radiated from the power source unit 3 can be efficiently exhausted by a simple structure.

(5) The inlet 2D is formed in the exterior case 2 of the projector 1, and the inlet 54A of the axial flow fan 54 is disposed in an inclined manner to this inlet 2D so as to be brought closer thereto toward the side surface of the projector 1. Accordingly, the noise leaking outside from the axial flow fan 54 itself via the inlet 2D can be reduced, and calmness during the operation of the projector 1 can be ensured.

(6) In the exterior case 2 of the projector 1, the outlet 212B is formed in the projection side of the projector 1, and the heated air exhausted from the projector 1 is exhausted to the projection side. In other words, the heated air is prevented from being blown against a person located on the back side or the side surface side of the projector 1.

(7) By exhausting the air inside the projector via the outlet 212B in the direction deviating from the projecting direction of the projector 1, the exhaust fan 55 can set the exhaust direction to be the direction deviating from the projected image by the projector 1, and prevent the projected image from being shaken by heated air.

(8) The casing 47 for optical components is formed in a substantially U-shape in plan view, the light source device 413 is disposed on one end thereof, and the projection lens 46 is disposed on the other end thereof to enable the exhaust from the projection side of the projector 1, a duct to lead the heated air exhausted from the exhaust fan 55 outside can be omitted, and the size of the projector 1 can be further miniaturized.

5. Modification of Embodiment

The preferred exemplary embodiment of the present invention is described above. The present invention is not limited to this embodiment, but can be improved or modified in the design scope so as not to deviate from the object of the present invention.

For example, in the above exemplary embodiment, the exhaust sirocco fan 55 is disposed close to the light source device 413. Nevertheless, it may be disposed away from the light source device 413. In other words, the inlet 55A of the exhaust sirocco fan 55 may only be disposed along the plane orthogonal to the optical path plane formed by the optical unit 4, and if the exhaust sirocco fan 55 is disposed away from the light source device 413, the heated air may be led to the exhaust sirocco fan 55 by using a duct or the like.

In the above exemplary embodiment, the outlet 212B from which the air exhausted from the projector 1 is exhausted is located on the projection side of the projector 1, but not limited thereto. In other words, the outlet may be set to be in the direction of the outlet 55B of the exhaust fan 55, and may be located on the side surface side or the back side of the projector 1.

In the above exemplary embodiment, the casing 47 for optical components is formed in a substantially U-shape in plan view, but not limited thereto. For example, it may be formed in a substantially L-shape in plan view, or other shape may be employed. If the casing is formed in a substantially L-shape in plan view, and the air is exhausted from the projection side of the projector 1, a duct to lead the air exhausted from the fan 55 to the outlet 212B is required.

In the above exemplary embodiment, the configuration is described, in which the inlet 55A of the exhaust sirocco fan 55 is formed only on one side, but not limited thereto. The configuration in which the inlet 55A is formed on both sides may be acceptable. In this case, there is an advantage that the air heated by the power source unit 3 can be sucked directly.

The shape of the exhaust sirocco fan 55, and the shape of the inlet 55A and the outlet 55B of the exhaust sirocco fan 55 may be arbitrary.

In the above exemplary embodiment, the configuration in which the axial flow fan 54 is employed as the air intake fan is described, but not limited thereto. For example, the fan may be employed similarly to the fans 51, 52, 53 and 55, or other fan may be employed.

In the above exemplary embodiment, the configuration is described, in which the exhaust sirocco fan 55 is disposed in an inclined manner so that the inlet 55A is brought closer toward the emitting direction of the light flux from the light source device 413, but not limited thereto. The configuration in which the inlet 55A is disposed along the emitting direction of the light flux from the light source device 413 may be employed.

In the above exemplary embodiment, only an example of the projector using three optical modulators is described. However, the present invention can also be applied to a projector using only one optical modulator, a projector using two optical modulators, or a projector using four or more optical modulators.

In the above exemplary embodiment, the liquid crystal panel is used for the optical modulator. However, the optical modulator other than the liquid crystal such as a device using a micro-mirror may be used.

In the above exemplary embodiment, the transmission optical modulator with the light entering surface and the light emitting surface different from each other is used. However, a reflection type optical modulator with the light entering surface and the light emitting surface identical to each other may be used.

In the above exemplary embodiment, only the example of the front type projector to perform the projection from the direction of observing a screen is introduced. However, the present invention can also be applied to a rear type projector to perform the projection from the direction opposite to the direction of observing a screen.

INDUSTRIAL APPLICABILITY

As described above, since a projector according to the present invention can enhance the exhaust efficiency and ensure calmness by efficiently sucking the air inside the projector, the projector is suitably used for the purpose of presentation, home theater etc.

The invention claimed is:

1. A projector comprising:
   a light source device;
   a power source unit that supplies power to the light source device;
   an optical modulator that modulates light flux emitted from the light source device according to image information;
   a projection optical system that projects the light flux modulated by the optical modulator in an enlarged manner; and
   an exhaust fan that exhausts air inside the projector outside, the exhaust fan being a centrifugal fan that exhausts the air sucked from the direction of a rotary shaft of the fan in the tangential direction of the rotation, and an inlet of the centrifugal fan disposed along the thickness of direction of the projector, and the centrifugal fan being disposed between the light source device and the power source unit.

2. The projector according to claim 1, the inlet of the centrifugal fan being disposed in an inclined manner to an optical axis of illumination of the light flux emitted from the light source device.

3. The projector according to claim 2, the inlet of the centrifugal fan being inclined toward an emitting direction of the light flux from the light source device.

4. The projector according to claim 1, the power source unit comprising:
   a lamp drive block that drives the light source device, and a power source block that supplies the power to the lamp drive block.

5. The projector according to claim 4, the centrifugal fan being disposed on an end of the lamp drive block and/or the power source block, wherein an air intake fan that sucks cooled air from the outside is disposed on another end facing the end.

6. The projector according to claim 5, an inlet, from which the outside air is sucked inside, being formed on an exterior case to accommodate the light source device, the optical modulator, and the projection optical system, and the air intake fan being disposed in an inclined manner to the inlet.

7. The projector according to claim 1, an outlet, which is located in a projecting direction of the light flux from the projection optical system and exhausts the inside air outside, being formed on the exterior ease to accommodate the light source device, the optical modulator, and the projection optical system, and the centrifugal fan exhausting the inside air in a direction separating from the projecting direction of the light flux, from the projection optical system via the outlet.

8. The projector according to claim 1, the light source device, the optical modulator, and the projection optical system being accommodated in a casing for optical components which is substantially U-shaped in plan view.

* * * * *